March 20, 1934.  C. L. STEVENS  1,951,496
REFRIGERATING APPARATUS AND METHOD
Filed Sept. 5, 1931   3 Sheets-Sheet 1

Inventor
Charles L. Stevens
by Roberts, Cushman + Woodberry
Att'ys.

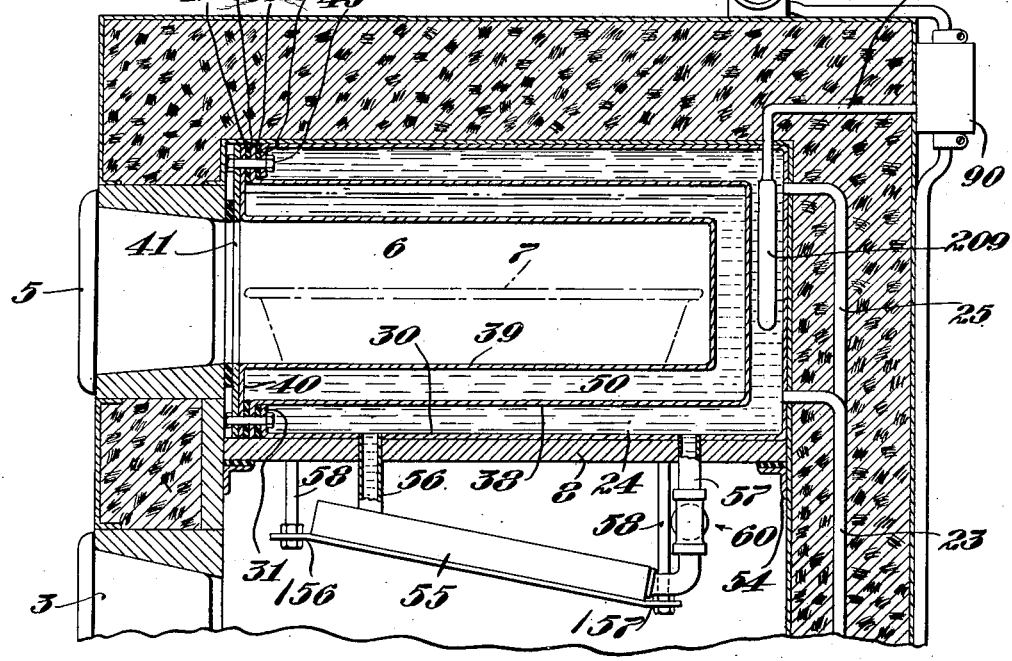
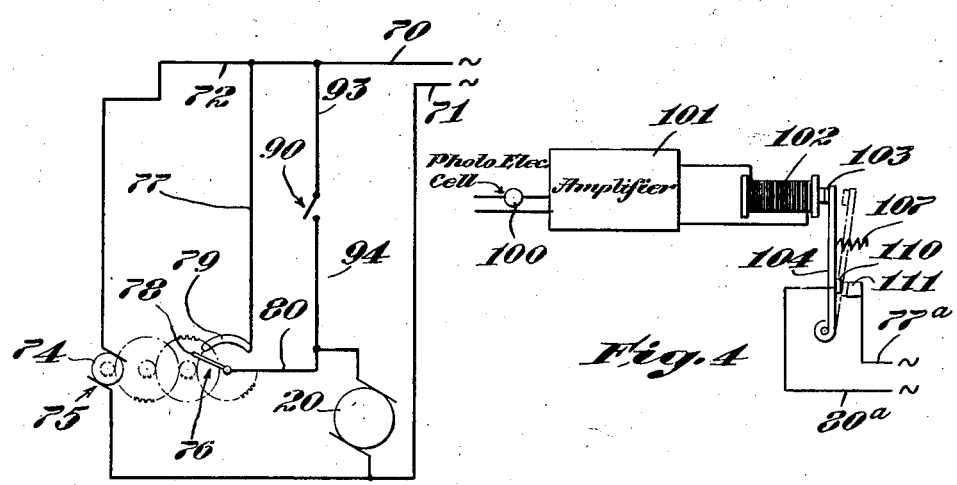

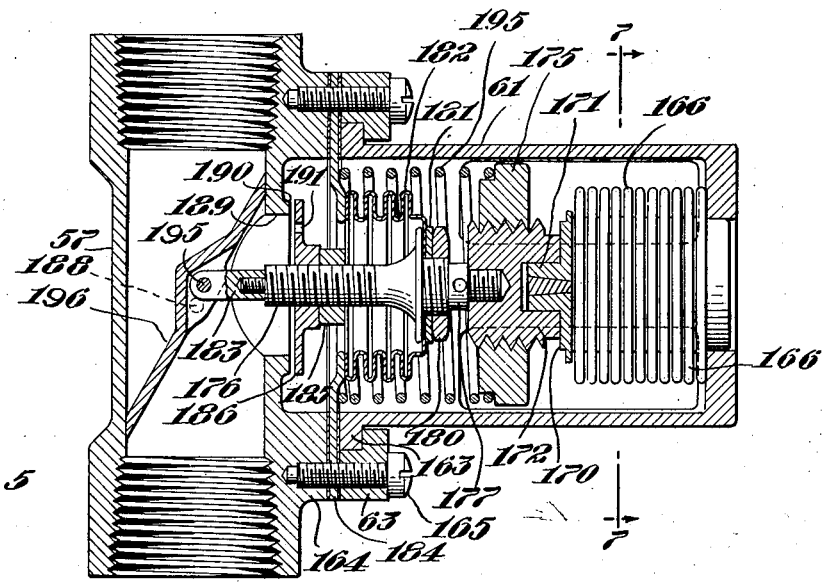
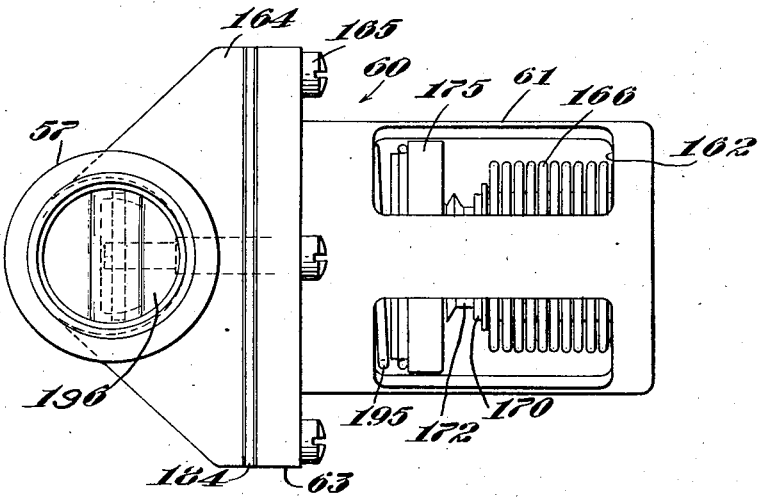
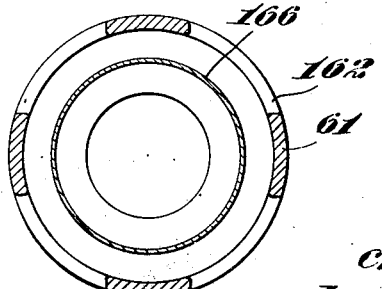

Patented Mar. 20, 1934

1,951,496

UNITED STATES PATENT OFFICE 1,951,496

REFRIGERATING APPARATUS AND METHOD

Charles L. Stevens, Norwood, Mass.

Application September 5, 1931, Serial No. 561,328

12 Claims. (Cl. 62—6)

This invention relates to an improved refrigerating apparatus and method, and more particularly affords an improved arrangement for controlling the operation of a mechanical refrigerator.

Energy is generally supplied to mechanical refrigerators by means of an electric current or a suitable stream of inflammable fluid, such as gas, and is employed to increase the pressure of a refrigerating medium, either directly by a mechanical compressor or by the heating of fluids in the system as in an absorption system. Apparatus of this type is commonly provided with control means which causes the supply of energy and operation of the unit for irregular intervals in accordance with the temperature conditions of the food compartment and/or the pressure conditions within the system. Thus, for example, a conventional compressor unit may be driven by an electric motor which is provided with a suitable control switch associated with regulating means to close the switch whenever the temperature of the food box rises beyond a predetermined point. In fact, practically every apparatus for artificially producing refrigeration is characterized by an intermittently operable pressure-increasing unit which is energized for irregular periods, depending upon temperature and/or internal pressure conditions, and the present invention is generally applicable to systems of this type which are commonly supplied with energy from house lighting and/or commercial electrical lines or from city gas mains.

The load on electric service lines and particularly those which are employed to supply electric current for commercial and household purposes normally reaches its highest point at certain periods, for example, late in the afternoon or early in the evening, and this load is comparatively light during the later part of the night and the early morning. Similarly the load on gas supply lines may vary, being much lighter during the later hours of the night and the early morning than during the day and early evening.

It is highly desirable from the point of view of a public utility company supplying energy for such household conveniences as refrigerators to have its load made more uniform, so that the normal peak may be lower and so that the normally light load, which for example is characteristic of the hours of the early morning, may be increased. Such a change in the load requirements of a public utility corporation permits the more efficient use of its facilities and does not require such a large capacity to meet the requirements of the maximum peak load, while permitting more effective use of the necessary capacity during the hours of the night, thereby reducing overhead expenses per unit of energy supplied.

This invention permits the loads imposed by refrigerating apparatus, such as apparatus of the household type, to occur during periods when current consumption or the consumption of energy may be comparatively low, thus tending to even out the load upon the supply lines, reducing the peak and adding to the total load when the latter is normally low. Accordingly, this invention permits distinct economies in the distribution of energy to individual users and as a result low rates may be provided for users of refrigerators of the type disclosed in this invention. For example, a special meter may be installed for a household refrigerator of the type disclosed herein and a low rate be given for the current passing through this meter. Thus substantial savings may be realized both by public utility companies and by individual users of refrigerators.

In order to permit these desirable results, the present invention provides a unit of high heat absorptive capacity or a cold-storing reservoir, which has a sufficient size to permit the storing of refrigeration during a certain part of a twenty-four hour period as, for example, during the night hours, and the gradual exhaustion of this stored refrigerating effect during the hours of the day when the load upon supply lines is relatively high. Thus, for example, I may provide a comparatively large body of fluid which is adapted to attain a more or less frozen or congealed condition and the melting of which may be effective in absorbing a relatively large quantity of heat while its temperature remains at substantially the same point. For this purpose I prefer to employ a brine solution which will start to freeze into a sludge at a point substantially below 32° F., for example, around 25° F.

The refrigerating machine preferably has control means which causes the supply of energy and the cooling of the unit of high heat absorptive capacity during periods when the load upon the electric supply lines or the like is comparatively low; thus, for example, I may provide a clock-controlled switch operable to permit supply of energy to the motor which drives the compressor of a refrigerating machine to operate this machine during the hours between 7 P. M. and 7 A. M. Instead of a clock-controlled circuit closer or switch I may provide a photoelectric cell which is operative to maintain the supply circuit open during hours when the room in which the refrigerator is located is comparatively light and which will permit the closing of the control switch and the supply of energy to the machine during the hours of darkness.

Preferably the cold unit is directly associated with a freezing chamber which may be arranged to receive suitable trays for the freezing of ice and the freezing or storage of frozen desserts or the storage of frozen foods, it being evident that the normally low temperature of the sludge tank is particularly suitable for such purposes. The food compartment preferably is separated from the cold-retaining unit by an insulating wall, while a limited flow of heat from the food compartment to the unit is permitted. For this purpose, for example, a suitable coolant-containing chamber disposed in heat transfer relation to the cold reservoir may be connected to a cooler within the food compartment. Preferably a temperature-responsive control member is disposed in or adjoining the food compartment and is adapted to regulate flow of coolant from the coolant chamber to the cooler so that the temperature of the food compartment may be automatically maintained at a substantially constant predetermined point, although the refrigerating machine is inoperative for continuous periods of many hours at a time.

Another aspect of the invention pertains to the arrangement of a thermostatic control instrumentality to cause operation of the refrigerating apparatus when the temperature of the cold unit rises above a predetermined point, while other control means may be provided to determine the temperature differential between the food compartment and cold unit. The temperature of the cold unit may thus be maintained at a point below 0° C., despite variations in the temperature of the food compartment. This arrangement is particularly advantageous when employed in conjunction with the time-responsive controlling means; when such a combination of control factors is employed, the thermostat may operate to cause the supply of energy to the refrigerating apparatus if unusual conditions make an abnormal refrigerating capacity desirable as, for example, when the doors of the refrigerator have been opened for a relatively large portion of the time, or during unusually hot weather. Ordinarily a refrigerator of this type is so designed, however, that the main time-responsive control will be sufficient to cause the machine to operate for a sufficient period of time to give adequate refrigerating capacity, the thermostatic control being designed to function only under unusual conditions.

In the accompanying drawings:

Fig. 2 is a vertical sectional view on a larger scale of the upper portion of the refrigerator shown in Fig. 1;

Fig. 3 is a wiring diagram;

Fig. 4 is a diagrammatic view showing the arrangement of a photoelectric cell which may be employed in place of the clock shown in Fig. 3;

Fig. 5 is a vertical section of a thermostatic control means to regulate the temperature of the food compartment;

Fig. 6 is a top view of the assembly shown in Fig. 5; and

Fig. 7 is a section on line 7—7 of Fig. 5.

Figure 1:
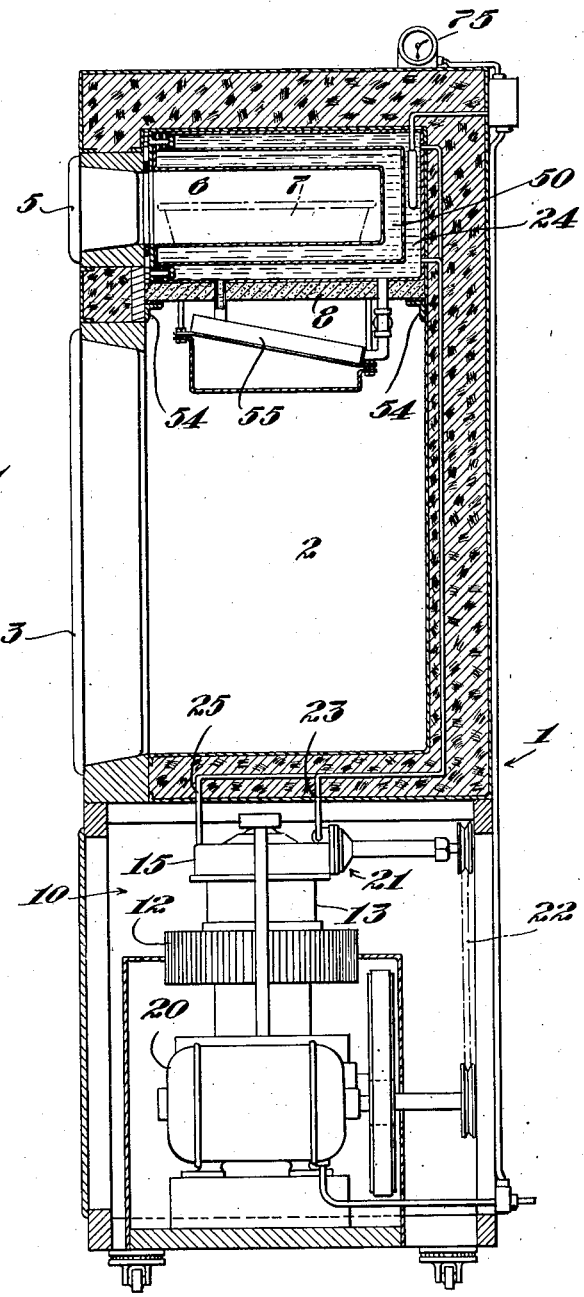
Fig. 1 is a vertical sectional view of a refrigerator in which the principles of this invention are embodied.

Referring to the accompanying drawings, and more particularly to Fig. 1, the numeral 1 designates the housing of a refrigerator which may be provided with a food compartment 2, access to this compartment being afforded by the door 3. Above the door 3 is a small door 5 affording access to a freezing chamber 6 which contains a suitable freezing tray 7. The freezing compartment 6 is separated from the food compartment 2 by a horizontal insulating wall 8.

Below the food compartment 2 is a machine chamber 10 which may contain any suitable refrigerating machine. For purposes of illustration, I have shown a machine of the general type disclosed in Patent No. 1,240,862 to Ivar Lundgaard, some of the details of the specific illutrated installation being more fully disclosed in the copending application of Mustafa Ajam, Serial No. 547,201. A machine of the character shown may employ air as a mediating fluid and may have a single cylinder with a compression chamber surrounded by cooling fins 12. A heat interchanger or regenerator portion 13, and a jacketed cold head or expansion chamber 15. An electric motor 20 may be arranged to drive this machine. Associated with the cold head is a suitable pump 21 driven by the electric motor 20 through a belt 22. This pump is arranged to impel a liquid coolant from the jacket of the cold head through an upwardly extending duct 23 to a cooling chamber 24 adjoining the freezing chamber. A return pipe 25 connects chamber 24 with the opposite side of the jacket of the cold head. A suitable coolant, such as a strong brine solution, or ethylene glycol, may be disposed in the jacket of the cold head and in the cooling chamber 24.

A compressed and cooled refrigerating medium such as air passes into the cold head 15 and expands, thus affording a refrigerating effect and lowering the temperature of the liquid coolant circulating through the jacket of the cold head. Accordingly, the coolant within the cooling chamber 24 reaches a low temperature as operation of the machine continues.

Fig. 2 illustrates in greater detail the arrangement of the cold unit, including the cooling chamber 24, the freezing compartment 6 and a cold-storing reservoir 50 therebetween. The chamber 24 may have an outer sheet metal wall member 30 with an inturned marginal flange 31 at one end adjoining the door 5. This flange 31 may engage a gasket 36 disposed in engagement with an outturned flange 37 upon the open end of an intermediate sheet metal member 38. An inner sheet metal member 39 enclosing the freezing chamber 6 may be provided with an outturned marginal flange 40, and a rectangular plate 41 may be disposed outside of the flange 40, a gasket 42 being located between the flanges 36 and 40. Suitable bolts 43 clamp the flanges and gaskets in firm abutting engagement with each other, and with the plate 41. Thus the cooling chamber 24 is formed between the sheet metal members 30 and 38. A second jacket 50 nested within the outer chamber 24 is provided between members 38 and 39. This jacket or reservoir may be sealed and be without any opening into any other part of the apparatus, and it may be filled with material of relatively high heat absorptive capacity. A solution of from 5% to 25% calcium chloride in water may be located in this chamber; such a solution may be chosen, for example, so that freezing starts around 25° F. and so that a considerable portion of the liquid may freeze to form a sludge while the temperature of the mass falls only a few degrees. Conversely, melting of this sludge will occur with its temperature remaining nearly constant. Due to the high latent heat of fusion of this solution, a large heat absorptive capacity is thus provided at a substantially constant low temperature. Obviously, the interior of the jacket 50 is defined by the sheet metal member 39 which provides the rectangular freezing chamber 6 for the reception of the freezing tray 7. The horizontal partition 8 of heat insulating board is disposed upon brackets 54 and may engage the lower face of member 30, thus supporting the same and serving to insulate the cold unit, including the freezing chamber 6, the reservoir 50 and the jacket 24 from the food compartment 2.

In the upper part of the food compartment, is a cooler 55 which may be in the form of a shallow tank having upper and lower faces of substantial area. Thus this tank may have a comparatively large heat absorptive surface, although its liquid containing capacity may be comparatively small; accordingly, the surface of the tank which is exposed in the food compartment may readily remain above the freezing point with conventional food storage temperatures of between 40° and 50° F. Preferably the tank is provided with suitable outstanding ledges 156 and 157 which are connected to studs 58 depending from the horizontal partition 8. Preferably, as shown, the cooler 55 may be slightly inclined to aid the thermal circulation of air in the food compartment 2. To permit the flow of coolant to the cooler I provide vertical connecting ducts 56 and 57 between the upper and lower ends of the tank and the lower part of the cooling chamber 24. Associated with one of these ducts, as for example the duct 57, may be suitable means 60 for automatically regulating the circulation of liquid between the cooler 55 and the chamber 24.

As shown in Figs. 5, 6 and 7, the control means 60 may include a cage portion 61 having openings 162 therein and an end flange 163 secured to a boss 164 on a section of the pipe 57 by screws 165 and a clamping plate 63. Engaging the outer end of the casing or cage 61 is an expansible-contractible metal bellows 166 which may contain a suitable gas, such as sulfur dioxide. A button 170 of non-heat conductive material, such for example as bakelite, may be disposed in engagement with the inner end of the bellows 164, this button having a central boss 171 engaging a recess in a bakelite member 172 that is externally threaded to receive a large annular element 175. The member 172 has internal threads receiving the end of a spindle 176. The spindle 176 has a collar 177 thereon to provide a shoulder to engage the member 172 and an enlarged portion of the spindle has external threads receiving a nut 180 which clamps a washer 181 of heat insulating material against the edge of a sealing bellows element 182, a shoulder upon the spindle cooperating with the nut 180 and washer 181 in clamping this portion of the bellows. The opposite end of bellows element 182 is welded to an annular plate 184, the opposite faces of which engage gaskets between the clamping plate 63 and the boss 164. A compression spring 195 is disposed between the plate 184 and member 175. A nut 185 and an internally threaded annular plate 186 are secured upon the spindle 176 adjoining an opening 189 which provides communication between the interior of the duct 57 and the bellows 182. A suitable annular face 190 upon the duct casting engages the plate 186 to provide a stop, and a vent 191 in the plate permits equalization of pressures at opposite sides of the plate, even when the plate engages the stop surface. The end of the spindle 176 is provided with a small threaded extension engaging a bar 183 which has a pivotal connection with a transverse pin 195, the ends of which are secured to a butterfly valve member 196 in the duct 57. Member 196 is mounted on pintles 188.

The cage 161 extends transversely at the rear of the cooler 55 so that the bellows 164 therein is exposed to the temperature of the cooled air circulating from the region above the cooler down into the lower part of the food compartment. The bakelite members 170 and 172 form a heat insulating bridge between the bellows 166 and the spindle 176 which is connected to the butterfly valve and accordingly tends to have the same temperature as the coolant in the pipe 57. Accordingly bellows 164 will expand and contract in accordance with the temperature of the air within the food compartment. As the bellows expands in response to an increase in the air temperature, the spindle 176 is pushed in the direction of the duct 57 to open the butterfly valve 196, thus permitting the circulation of coolant between the cooling chamber 24 and the cooler 55. When the temperature of the air within the food compartment falls, the bellows contracts to permit the butterfly valve to be moved toward its closed position. The spring 195 engaging the members 175 and 184 is effective in causing the bellows to contract and move the spindle toward the position illustrated in Fig. 5, wherein the valve is closed. It is thus evident that as long as residual heat absorptive capacity is adequately maintained in the cold unit the factor 60 is effective in permitting the air within the food compartment to remain at a proper temperature.

The location of the cooling unit or cooler 55 at the top of the food compartment is particularly advantageous since natural convection currents of air within the food compartment are effective in maintaining the temperature of this air and of the materials within the compartment at a substantially uniform temperature throughout all parts of the compartment. In other words, the temperature of the air in the top of the food compartment is very close to the temperature of the air adjoining the floor of this compartment.

The details of the control arrangement which may be employed with refrigerating apparatus of the character described may be understood by reference first to the wiring diagram of Fig. 3. Leads 70 and 71 are connected to the exterior source of supply as, for example, to the conventional socket outlet, the lead 71 being connected directly to one side of the motor 20. The lead 70 is provided with a branch 72 connected to the motor 74 of a chronometric circuit closer, that is designated in general by numeral 75. This circuit closer may be of the conventional type such as is employed with certain types of electric signs, heating appliances, etc. to cause operation during a desired fraction of a twenty-four hour period. The lead 70 is connected by a lead 77 to one side of the clock-controlled switch 76. When the contacts 78 and 79 of this switch are in engagement, current flows through the lead 80 to the motor 20, thus completing the main motor circuit and causing the motor 20 to drive the refrigerating machine. It is thus evident that when the circuit is closed in this manner by the controller 75, the motor 20 is energized and the refrigerating machine is in operation, and that when the switch 76 is opened, the motor no longer receives current through the leads 70, 77 and 80. In addition to the time-responsive circuit closer, I prefer to provide a thermostatically controlled switch 90. Switch 90 preferably operates in response to the temperature of a hollow metal bulb 209 in chamber 24 and preferably is designed to act within a temperature range of a comparatively few degrees, so that as soon as the temperature of the coolant within the chamber 24 rises a few degrees above its desired low temperature due to substantial melting of the sludge in chamber 50, the circuit will be closed by the control 90. This control preferably is connected to a branch 93 of the lead 70 and is connected by a lead 94 to the lead 80; thus when the member 90 closes the circuit between leads 93 and 94, current may pass through leads 70, 93, switch 90, and lead 94 to one side of the motor, returning through the lead 71. It is thus evident that the thermostatic switch 90 is connected in parallel with the clock control switch 78—79.

Switch 90 preferably may close when the coolant temperature in chamber 24 rises to a point which it normally attains when substantially all of the sludge has melted, and may open at a point corresponding to the freezing of a substantial fraction of the sludge, although the thermostatic control for switch 90 may be adjusted if desired to vary the temperatures which effect switch opening and closing. With the preferred adjustment, if the temperature of cold unit rises to a point near 0° C., the motor circuit closes independently of the time-responsive circuit closer and will continue closed until the sludge is well frozen. For example, if due to unusual conditions the sludge has melted by 5 P. M., the thermostatic control 90 may cause operation of the machine; at 7 P. M. the clock-controlled circuit also closes and operation of the machine continues until the clock switch is opened, for example, until 7 A. M. If the sludge has not by that time frozen to the desired degree, the switch 90 remains closed until this condition is attained. Ordinarily, however, the time-responsive circuit closer causes operation of the machine for a sufficient period to cause adequate freezing of the sludge in addition to providing refrigeration during this period, while, during the period of machine idleness, the residual refrigerating capacity of the cold unit is sufficient to meet normal requirements.

Fig. 4 is a diagrammatic representation of a light sensitive control which may be employed instead of the clock and which may be effective in causing the supply of energy to the motor 20 when the region surrounding the refrigerator is in darkness, as, for example, during the night hours. For this purpose a conventional photoelectric cell 100 may be provided with a conventional amplifier 101 which provides sufficient current to a magnet 102 to attract the armature 103 upon a swinging arm 104 as long as the cell 100 is exposed to a suitable quantity of light. When light is no longer effective in causing energization of the relay magnet 102 through the photoelectric cell and its amplifier, the spring 107 is effective in moving the armature and arm 104 away from the magnet, a contact 110 upon the arm engaging a fixed contact 111 to close the circuit between leads 77ª and 80ª corresponding to leads 77 and 80 in Fig. 3.

Referring to Figs. 1 and 2, it may be seen that the clock 75 may be conveniently located on the top of the refrigerator housing 1. The bulb 209 containing expansible fluid, such as sulfur dioxide, is connected by a tube 291 to a conventional expansible-contractible bellows controlling the switch 90 at the rear of the cabinet. Since the structural details of this thermostatic means and the switch 90 controlled thereby may be conventional, I have not illustrated the same in detail.

In the operation of apparatus of this character, when energy is being supplied to the motor 20 a mediating fluid, such as air, is compressed in the lower part of the machine being cooled by the fins 12 and passing to the interior of the cold head 15 where the cooled air is expanded, thus cooling the liquid in jacket 15. The pump 21 pumps this cool liquid through the cooling chamber 24. Thus the solution in the tank 50 gives up heat so that freezing of liquid crystals in this solution takes place, the sludge becoming frozen to a greater degree as the motor continues running. It is evident that when the chronometric means 75 is employed, energy is imparted to the motor for a predetermined portion of the twenty-four hour day as, for example, during the night and early morning hours, and that during the remainder of the twenty-four hour period energy is no longer supplied in this manner.

During the inoperative period of the motor, the frozen sludge in chamber 50 melts and absorbs heat from the liquid in chamber 24 as well as from the material in chamber 6. Chamber 24 communicates with the cooler 55 through ducts 56 and 57, so that heat absorbed by the cooler 55 from the contents of the food compartment 2 is carried by the circulating liquid to the chamber 24 and given up to the melting sludge in the chamber 50. Since the latent heat of fusion of this sludge is comparatively high, the chamber 50 provides a cold storage reservoir of high heat absorptive capacity. Material in the tray 7 is exposed in direct heat transfer relation to the sludge in chamber 50 so that a low freezing temperature is maintained.

Should an unusually high refrigerating capacity be necessary, the liquid in cooling chamber 24 will warm up sufficiently as, for example, due to the high temperature of cooler 55 and consequent rapid melting of sludge in chamber 50, so that the temperature of the coolant becomes high enough to close the thermostatically controlled switch 90, thus causing the operation of the motor 20 during a portion of the normally idle period for a sufficient length of time to cause sludge to freeze in chamber 50 until the temperature of the coolant in chamber 24 falls sufficiently to cause the switch 90 to open. Thus, infrequently at irregular periods during the day the thermostatic member 90 may operate to cause the supply of energy and operation of the refrigerating machine.

The metal bellows 166 controlling the butterfly valve 186 is effective in causing the interior of chamber 2 to be maintained at a substantially constant temperature.

If the photoelectric cell arrangement of Fig. 4 is employed in place of the clock-controlled circuit closer, the operation is substantially the same except that the photoelectric cell is effective in holding the main circuit between leads 77ª and 80ª open during periods when the cell is exposed to exterior light permitting the switch 110—111 to close during the period of darkness, thus performing the same function as is effected by the contact of members 78 and 79. It is therefore evident that the light sensitive control means diagrammatically illustrated in Fig. 4 is for practical purposes a time-responsive control instrumentality operating in the same general manner as the clock means 75 of Fig. 3, and the following claims, which recite a time-responsive controlling means, are to be construed as covering both the arrangement of Fig. 3 and that of Fig. 4, unless the context is clearly inconsistent with such a construction.

From the foregoing it is evident that I have provided refrigerating apparatus which is adapted automatically to operate during periods when the peak load upon power supply lines may be low, thus reducing the normally high peak and increasing the normal minimum load and, furthermore, that this arrangement permits the maintenance of suitable refrigerating capacity in spite of abnormal or unusual conditions due to the arrangement of the thermostatically controlled switch 90 in parallel with the clock controlled or photoelectric cell controlled circuit closer. Furthermore, the arrangement of the butterfly valve 186 and its controller 60 permits the temperature of the food compartment to be maintained at a substantially constant point despite variations in exterior temperatures as well as variations in the frequency and length of periods during which the door 3 is open, and further, despite any slight changes which may occur in the temperature of the coolant in chamber 24.

It is evident that the cold storage unit makes use of the latent heat of melting to afford a relatively large heat absorptive capacity over a long period of time without substantial variations in the temperature of the sludge in chamber 50 or the coolant in chamber 24. Accordingly the temperature in the freezing compartment 6 may always remain below freezing and there is a large refrigerating effect directly acting upon the tray 7 to cause rapid freezing of material in this tray and continued maintenance of sub-freezing temperatures.

The arrangement of a thermostatically controlled switch 90 to cause operation of the refrigerating machine in response to the temperature conditions of the cold unit and the freezing chamber 6 is especially advantageous, since it assures a sufficiently low temperature for freezing purposes even should the room temperature be comparatively low so that there is little or no demand for refrigeration in the food compartment. This arrangement, particularly when employed in conjunction with control means to maintain the food compartment at a suitable temperature higher than the cold unit, is generally advantageous and is especially desirable when combined with a time-responsive control factor to cause the normal operation of the refrigerating machine for regular periods of determined length, thereby permitting the load on the energy supply line, such as the electric supply circuit or the gas mains, to be made more uniform.

It should be understood that the present disclosure is for the purpose of illustration only and that this invention includes all modifications and equivalents which fall within the scope of the appended claims.

I claim:

1. Refrigerating apparatus comprising a unit for increasing the pressure of a refrigerant, cooling means for abstracting heat from the refrigerant, and a cold unit through which heat passes to the refrigerant, said cold unit having high heat absorptive capacity whereby it affords refrigerating effect during a relatively long period, a time-responsive controlling instrumentality effective to cause the operation of the pressure-increasing unit during definite periods which are separated from succeeding periods by relatively long periods during which the refrigerating effect is obtained from said cold unit, a food compartment, and means between said compartment and cold unit to permit limited heat flow therebetween.

2. Refrigerating apparatus comprising a unit for increasing the pressure of a refrigerant, cooling means for abstracting heat from the refrigerant, and a cold unit through which heat passes to the refrigerant, said cold unit containing a body of congealable material capable of absorbing a large quantity of heat upon melting, whereby it affords refrigeration during a relatively long period, a time-responsive controlling instrumentality to effect the periodic operation of the pressure-increasing unit, a food compartment, and means between said compartment and cold unit to permit limited heat flow therebetween.

3. Refrigerating apparatus comprising a unit for increasing the pressure of a refrigerant, cooling means for abstracting heat from the refrigerant, and a cold unit through which heat passes to the refrigerant, said cold unit containing a body of congealable material capable of absorbing a large quantity of heat upon melting, whereby it affords refrigerating effect during a relatively long period, a freezing compartment in good heat transfer relation to said cold unit, a time-responsive controlling instrumentality to effect the periodic operation of the pressure-increasing unit, a food compartment, and means between said compartment and cold unit to permit limited heat flow therebetween.

4. Refrigerating apparatus comprising a unit for increasing the pressure of a refrigerant, cooling means for abstracting heat from the refrigerant, and a cold unit through which heat passes to the refrigerant, said cold unit having high heat absorptive capacity whereby it affords refrigerating effect during a relatively long period, a time-responsive controlling instrumentality to effect the periodic operation of the pressure-increasing unit, a food compartment, means between said compartment and cold unit to permit limited heat flow therebetween, and a thermostatically controlled device regulating the flow of heat through said last-named means.

5. Refrigerating apparatus comprising a unit for increasing the pressure of a refrigerant, cooling means for abstracting heat from the refrigerant, and a cold unit through which heat passes to the refrigerant, said cold unit having high heat absorptive capacity whereby it affords refrigerating effect during a relatively long period, a time-responsive controlling instrumentality to effect the period operation of the pressure-increasing unit, a food compartment, means between said compartment and cold unit to permit limited heat flow therebetween, and a heat-responsive control instrumentality for effecting the operation of the compression unit independently of said time-responsive instrumentality.

6. Art of refrigeration, which involves the employment of a factor of high heat absorptive capacity, comprising the compression of refrigerant during periods of definite extent of time as by the employment of chronometric means, cooling the refrigerant, employing the cooled refrigerant to remove heat from said factor and thus causing the factor to have large heat absorptive ability, and regulating the flow of heat to said factor in accordance with the temperature of a region to be refrigerated, thereby maintaining said region at a substantially constant temperature.

7. Refrigerating apparatus of the class described, comprising a refrigerating machine, energy supplying means to cause operation of said machine, a time-responsive control instrumentality to cause the periodic supply of energy by said means, a food compartment, a freezing chamber, a cold unit including a liquid containing chamber arranged to transfer heat to said machine and a reservoir containing congealable material, said compartment and chamber being in heat-transfer relation to said unit, and thermostatic control means to cause the supply of energy by said first-named means in response to a temperature of the cold unit at which substantially all of said material has melted, said thermostatic means operating independently of said control instrumentality.

8. Refrigerating apparatus of the class described, comprising a refrigerating machine, energy supplying means to cause operation of said machine, a time-responsive control instrumentality to cause the periodic supply of energy by said means, a food compartment, a freezing chamber, a cold unit including a liquid containing chamber arranged to transfer heat to said machine and a reservoir containing congealable material, thermostatic control means to cause the supply of energy by said first-named means in response to a temperature of the cold unit at which substantially all of said material has melted, said thermostatic means operating independently of said control instrumentality, a cooler in the food compartment, a duct through which liquid flows from the liquid containing chamber to the cooler, and a control factor associated with said duct to vary the flow of liquid therethrough.

9. Refrigerating apparatus of the class described, comprising a refrigerating machine, energy supplying means to cause operation of said machine, a time-responsive control instrumentality to cause the periodic supply of energy by said means, a food compartment, a freezing chamber, a cold unit including a liquid containing chamber arranged to transfer heat to said machine and a reservoir containing congealable material, thermostatic control means to cause the supply of energy by said first-named means in response to a temperature of the cold unit at which substantially all of said material has melted, said thermostatic means operating independently of said control instrumentality, a cooler in the food compartment, a duct through which liquid flows from the liquid containing chamber to the cooler, and a control factor associated with said duct to vary the flow of liquid therethrough, said control factor being effective in maintaining the food compartment at a substantially constant temperature.

10. Refrigerating apparatus of the class described, comprising a refrigerating machine, energy supplying means to cause operation of said machine, a time-responsive control instrumentality to cause the periodic supply of energy by said means, a food compartment, a freezing chamber, a cold unit including a liquid containing chamber arranged to transfer heat to said machine and a reservoir containing a congealable material, said compartment and chamber being in heat-transfer relation to said unit, and thermostatic control means to cause the supply of energy by said first-named means in response to a temperature of the cold unit at which substantially all of said material has melted, the operation of said control means to supply energy to the machine being automatically terminated when the cold unit temperature falls to a point at which substantially all of the material has congealed, said thermostatic means operating independently of said control instrumentality.

11. Refrigerating apparatus of the class described, comprising a food compartment, a low temperature chamber, a refrigerating machine containing refrigerant and having a cold end, a coolant system containing a liquid coolant, said system having a part in heat transfer relation to said cold end, a cooling chamber, and a cooler in said compartment, the cooling chamber and cooler both communicating with said part, a reservoir containing a congealable liquid in heat transfer relation to said cooling chamber and to said low temperature chamber, whereby a large residual cooling effect may be provided by the congealing of the liquid in the reservoir, and a time-responsive control instrumentality to cause periodic operation of the machine.

12. Refrigerating apparatus of the class described, comprising a food compartment, a low temperature chamber, a refrigerating machine containing refrigerant and having a cold end, a coolant system containing a liquid coolant, said system having a part in heat transfer relation to said cold end, a cooling chamber, and a cooler in said compartment, the cooling chamber and cooler both communicating with said part, a reservoir containing a congealable liquid in heat transfer relation to said cooling chamber and to said low temperature chamber, whereby a large residual cooling effect may be provided by the congealing of the liquid in the reservoir, a time-responsive control instrumentality to cause periodic operation of the machine, and thermostatic control means to cause operation of the machine independently of said machine, when congealed liquid in the reservoir has substantially melted.

CHARLES L. STEVENS.